(12) United States Patent
Den Dulk et al.

(10) Patent No.: US 9,874,294 B2
(45) Date of Patent: Jan. 23, 2018

(54) VALVE WITH MATERIAL HAVING MODIFIABLE DEGREE OF PENETRABILITY

(75) Inventors: Remco Christiaan Den Dulk, Eindhoven (NL); Roel Penterman, Eindhoven (NL); Menno Willem Jose Prins, Rosmalen (NL)

(73) Assignee: KONINKLIJKE PHILIPS N.V., Eindhover (NL)

( * ) Notice: Subject to any disclaimer, the term of this patent is extended or adjusted under 35 U.S.C. 154(b) by 1566 days.

(21) Appl. No.: 13/375,789

(22) PCT Filed: Jun. 2, 2010

(86) PCT No.: PCT/IB2010/052461
§ 371 (c)(1),
(2), (4) Date: Feb. 7, 2012

(87) PCT Pub. No.: WO2010/140128
PCT Pub. Date: Dec. 9, 2010

(65) Prior Publication Data
US 2012/0126154 A1    May 24, 2012

(30) Foreign Application Priority Data
Jun. 3, 2009   (EP) ..................... 09161806

(51) Int. Cl.
*F16K 99/00* (2006.01)
*B01L 3/00* (2006.01)

(52) U.S. Cl.
CPC .... *F16K 99/0001* (2013.01); *B01L 3/502738* (2013.01); *F16K 99/0044* (2013.01);
(Continued)

(58) Field of Classification Search
CPC .. F16K 31/002; F16K 31/025; F16K 99/0046; F16K 99/0001; F16K 99/0044;
(Continued)

(56) References Cited

U.S. PATENT DOCUMENTS 6,375,901 B1 * 4/2002 Robotti et al. ............ 137/807
6,536,476 B2   3/2003 Ueno
(Continued)

FOREIGN PATENT DOCUMENTS

JP   2002147628 A   5/2002
WO   2007023430 A1  3/2007
(Continued)

OTHER PUBLICATIONS

Bowden, Ned et al "Self Assembly of Mesoscale Objects into Ordered Two-Dimensional Arrays" Science, vol. 273, Apr. 11, 1997, pp. 233-235.

*Primary Examiner* — Eric Keasel

(57) ABSTRACT

The invention relates to a valve (2) for controlling a passage of particles from a first region (6) to a second region (7), wherein the valve (2) comprises a valve material (4) having a modifiable degree of penetrability and a valve region (16) comprising the valve material (4), wherein the valve region (16) and the valve material (4) are adapted such that the particles have to penetrate the valve material (4) if the particles pass the valve (2) for being transferred from the first region (6) to the second region (7). The degree of opening of the valve (2) can easily be controlled by modifying the degree of penetrability of the valve material (4), for example, by modifying the temperature of the valve material (4). Moreover, by penetrating the valve material (4) the particles can be separated from other elements like a fluid containing the particles.

17 Claims, 12 Drawing Sheets

(52) U.S. Cl.
CPC ....... *F16K 99/0046* (2013.01); *B01L 3/50273* (2013.01); *B01L 2200/0647* (2013.01); *B01L 2200/10* (2013.01); *B01L 2200/12* (2013.01); *B01L 2300/0816* (2013.01); *B01L 2300/161* (2013.01); *B01L 2400/0672* (2013.01); *B01L 2400/0677* (2013.01); *Y10T 29/49405* (2015.01)

(58) Field of Classification Search
CPC ......... Y10T 29/49405; B01L 3/502738; B01L 3/50273; B01L 2200/12; B01L 2200/10; B01L 2300/161; B01L 2300/0816; B01L 2400/0672; B01L 2400/0677
USPC ........... 137/807, 828; 422/82; 210/222, 223, 210/695; 209/213–232
See application file for complete search history.

(56) References Cited

U.S. PATENT DOCUMENTS

| | | | |
|---|---|---|---|
| 6,679,279 B1 | 1/2004 | Liu | |
| 6,770,323 B2 | 8/2004 | Genzer | |
| 7,195,036 B2* | 3/2007 | Burns et al. | 137/828 |
| 8,304,188 B2 | 11/2012 | Kelso | |
| 2002/0054835 A1 | 5/2002 | Robotti et al. | |
| 2003/0019522 A1 | 1/2003 | Parunak | |
| 2004/0219732 A1 | 11/2004 | Burns | |
| 2005/0084424 A1 | 4/2005 | Ganesan | |
| 2005/0247356 A1 | 11/2005 | Welle | |
| 2006/0219308 A1 | 10/2006 | Oh | |
| 2006/0278287 A1 | 12/2006 | Fielden | |
| 2007/0280858 A1 | 12/2007 | Nakayama | |
| 2008/0031787 A1* | 2/2008 | Yu | 422/188 |
| 2008/0058991 A1 | 3/2008 | Lee | |
| 2008/0112855 A1 | 5/2008 | Lee | |
| 2010/0330575 A1 | 12/2010 | Bruce | |
| 2012/0129156 A1 | 5/2012 | Kelso | |

FOREIGN PATENT DOCUMENTS

| | | | |
|---|---|---|---|
| WO | 2007060523 A1 | 5/2007 | |
| WO | 2007110779 A2 | 10/2007 | |

* cited by examiner

VALVE WITH MATERIAL HAVING MODIFIABLE DEGREE OF PENETRABILITY

FIELD OF THE INVENTION

The present invention relates to a valve for controlling a passage of particles from a first region to a second region and to a multi-region device comprising the valve. The invention relates further to a method for manufacturing the valve and to a method for manufacturing the multi-region device.

BACKGROUND OF THE INVENTION

U.S. Pat. No. 6,679,279 B1 discloses a fluidic valve being adapted to switch a state of flow of fluid in a fluid communication channel of a fluid guiding structure. Heating a bi-phase valve element causes a change of a state of the bi-phase valve element from a high viscosity state to a low viscosity state. If the valve is closed, the bi-phase valve element is in a high viscosity state and clogs the fluid communication channel. For opening the valve the bi-phase valve element that clogs the fluid communication channel can be pushed into an expanded portion of the fluid communication channel by an application of pressure to the fluid while the bi-phase valve element is in the low viscosity state, unclogging the fluid communication channel. For closing the valve the bi-phase valve element can be pushed from a valve element source chamber into the fluid communication channel by using a pump fluid entering the source chamber at a pump inlet while the bi-phase valve element is in the low viscosity state, wherein the bi-phase valve element pushed into the fluid communication channel is switched to the high viscosity state and clogs the fluid communication channel. Thus, a relatively complicated structure is needed for controlling the viscosity state of the bi-phase valve element and for pushing the bi-phase valve element out of the fluid communication channel and into the fluid communication channel for opening and closing the valve, respectively.

SUMMARY OF THE INVENTION

It is an object of the present invention to provide a valve allowing controlling a passage of particles from a first region to a second region with a technically less complex arrangement. It is a further object of the present invention to provide a corresponding multi-region device comprising the valve and methods for manufacturing the valve and the multi-region device.

In a first aspect to the present invention a valve for controlling a passage of particles from a first region to a second region is presented, wherein the valve comprises a valve material having a modifiable degree of penetrability and a valve region comprising the valve material wherein the valve region and the valve material are adapted such that the particles have to penetrate the valve material if the particles pass the valve for being transferred from the first region to the second region.

Since the degree of penetrability of the valve material is modifiable and since the valve material is adapted such that the particles have to penetrate the valve material if the particles pass the valve for being transferred from the first region to the second region, the degree of opening of the valve can easily be controlled by modifying the degree of penetrability of the valve material.

The degree of penetrability can easily be controlled by a valve control unit, which controls the valve material such that a desired degree of penetrability is achieved. It is not necessary to provide a further control unit and, for example, pressure means for pushing a valve element out of a communication channel or into a communication channel for opening or closing the valve, respectively. This allows providing a valve being technically less complex.

Furthermore, if in the first region a fluid is present comprising the particles, the degree of penetrability of the valve material can be controlled such that a) the particles can penetrate the valve material for allowing the particles to be transferred from the first region to the second region and b) the fluid can substantially not penetrate the valve material. This allows separating the particles from the fluid present in the first region.

The first region, which might be a first chamber, and the second region, which might be a second chamber, which are connected by the valve region such that particles can be transferred from the first region to the second region via the valve region. The valve material is preferentially located within the valve region such that the particles have to penetrate the valve material if the particles pass the valve for being transferred from the first region to the second region.

The valve material is preferentially adapted to allow magnetic particles penetrating the valve material. The magnetic particles are preferentially actuated by a magnetic field which forces the magnetic particles through the valve material if the degree of penetrability of the valve material is controlled such that the magnetic particles can penetrate the valve material. In the first region the magnetic particles are preferentially provided in a fluid, wherein by passing the valve the magnetic particles are separated from the fluid.

The degree of penetrability is preferentially modifiable with respect to particles having a diameter between 3 nm and 10000 nm, further preferred between 10 nm and 5000 nm, and even further preferred between 50 nm and 3000 nm.

It is further preferred that the valve further comprises a valve control unit for controlling the degree of penetrability of the valve material.

It is further preferred that the valve control unit is adapted to control at least one of the phases and the viscosity of the valve material for controlling the degree of penetrability.

For example, the valve control unit can be adapted to modify the phase of the valve material from a solid state to a fluid state, wherein by transferring the valve material from the solid state to the fluid state the degree of penetrability is increased. Correspondingly, if the valve control unit transfers the state of the valve material from the fluid state to the solid state, the degree of penetrability is decreased. In a further embodiment, the valve control unit and the valve material can be adapted such that the viscosity is modified from a high viscosity to a low viscosity to increase the degree of penetrability of the valve material, and to modify the viscosity from a low viscosity to a high viscosity to decrease the degree of penetrability. If the valve material has visco-elastic properties, the valve control unit and the valve material can be adapted such that the visco-elastic property of the valve material is changed to increase or decrease the viscosity of the valve material for decreasing or increasing the degree of penetrability, respectively.

Since the valve material is a phase-change material and/or a viscosity change material, the valve material can be kept in a stable non-penetrable state for most of the time, for example, during storage, and is preferentially only changed to a penetratable state when a transfer of particles is needed. The transfer can be a rapid process, exposing the valve material in its penetrable state only during a short time to a (bio)chemical composition of the fluid. Thus, if the (bio) chemical composition has the ability to modify the characteristics of the valve material and to change the stability or reproducibility of the valve material, the (bio)chemical composition of the fluid only has a very short time to modify the valve material. The rapid switching between a state, in which the valve material is penetratable, and a state, in which the valve material is not penetratable, allows to use the valve with a large variety of (bio)chemical compositions, in particular, with a large variety of (bio)chemical fluid compositions, and provides a good stability and reproducibility of the valve. Possible (bio)chemical compositions, which could modify the valve material, are detergents, salts, enzymes et cetera.

The valve material and the valve control unit are preferentially adapted such that the degree of penetrability is controlled between a non-penetratable state, in which the particles cannot penetrate the valve material, and a penetratable state, in which the valve material is penetratable. Thus, the valve control unit and the valve material are preferentially adapted such that the valve material is switchable between a non-penetratable state and a penetratable state.

It is further preferred that the valve material and the valve control unit are adapted such that the valve material is switchable between a solid state in which the degree of penetrability is reduced and a liquid state in which the degree of penetrability is increased.

The valve material is in an example in the solid state under storage temperatures, in particular, at/under room temperature of about 20° C.

It is further preferred that the valve material is adapted such that the degree of penetrability of the valve material is temperature dependent. This allows controlling the degree of penetrability of the valve material easily by controlling the temperature of the valve material. The temperature of the valve material is preferentially controlled by the valve control unit.

The temperature of the valve material can be controlled by using electrical heating elements and preferentially also by using cooling elements. The temperature of the valve material can also be controlled by directing light onto the valve material for being absorbed by the valve material for heating the same. The valve material can comprise black pigments like carbon black in order to increase the absorption of the light. As a light source for heating the valve material a laser or a non-lasing light source can be used.

The valve material is preferentially meltable. The valve material is preferentially a wax like paraffin or polyethyleneglycol. Preferred paraffin waxes have a melting point between 25° C. to 50° C., 44 to 46° C., between 53 to 57° C., between 58 to 62° C., or between 70 to 80° C. Preferred paraffin waxes are paraffin waxes being available from the company Sigma-Aldrich. Melting points in the range of 0° C. to 100° C. are designable.

It is further preferred that the valve material is hydrophobic.

If the valve material is hydrophobic, the probability that the valve material mixes up with aqueous fluids is reduced. This increases the life time of the valve material and, thus, of the valve, if the valve is adapted for being used with aqueous fluids.

The valve control unit can be a control unit which is adapted to control the degree of penetrability of the valve material independently from other units or the valve control unit can be adapted to control the degree of penetrability in cooperation with further units. For example, the valve can comprise a heating element for heating the valve material, wherein a control unit for controlling the heating element can be an external unit which is connectable to the heating element for controlling the degree of penetrability of the valve material.

The valve control unit can also be an external unit not being integrated in the valve. For example, a multi-region device comprising the valve can be introduced into an external holder, wherein this external holder comprises heating elements and a heating element control unit forming the valve control unit for controlling the degree of penetrability of the valve material. This external unit can also comprise functionalities for actuating the particles through the valve and/or for analyzing the particles.

It is further preferred that the valve material is hydrophilic.

If the valve material is hydrophilic, the probability that the valve material mixes up with hydrophobic, in particular, oily, fluids, is reduced. This increases the life time of the valve material and, thus, of the valve, if the valve is adapted for being used with hydrophobic, in particular, oily, fluids.

In a state, in which particles penetrate the valve material, the valve material has examplary an interfacial tension with water lower than 100 mN/m, further preferred lower than 72 mN/m, further preferred lower than 50 mN/m, further preferred lower than 25 mN/m and even further preferred lower than 10 mN/m. In an embodiment, the interfacial tension with water is 60 mN/m, if the valve material is in a state, in which it is penetratable for particles. If the interfacial tension with water has such a low value, only a small actuation force is needed to transport the particles from the first region through the valve material to the second region.

In addition, in an example the interfacial tension with water is larger than 1 mN/m. In an embodiment, the valve material has an interfacial tension with water of 1.52 mN/m.

It is further preferred that the valve material is inert. Since the valve material is preferentially chemically inert, it is substantially chemically inactive with respect to elements contacting, in particular, penetrating, the valve material, i.e. the valve material substantially does not react with these elements which might be fluids like water, magnetic particles et cetera. This yields a long lifetime of the valve material and, thus, of the valve.

In particular, the valve material is preferentially immiscible and inert with respect to water. The valve can therefore easily be manufactured by providing hydrophilic regions and hydrophobic regions, wherein water and the valve material are applied to these regions. The water will substantially only be arranged at the hydrophilic regions, allowing the valve material to be located substantially at the hydrophobic regions. Thus, the valve can easily be manufactured by providing hydrophobic and hydrophilic regions, by applying water and the valve material in a fluidic state respectively to the hydrophilic and hydrophobic regions, and by modifying the viscosity of the valve material such that it becomes solid. After the valve material has become solid, the water is removed, wherein first and second regions and the valve material forming the valve together with the valve control unit remain.

Preferentially, for manufacturing the valve by providing hydrophilic regions and hydrophobic regions, wherein water and the valve material are applied to these regions, firstly the water is applied and then the fluid, in particular, the liquid, valve material is applied.

In a further aspect of the present invention a multi-region device is provided, wherein the multi-region device comprises:
- a first region and a second region,
- a valve as claimed in claim 1, wherein the valve is arranged between the first region and the second region for controlling a passage of particles from the first region to the second region.

The multi-region device is preferentially a multi-chamber diagnostic device.

The multi-region device is preferentially a sample preparation device, e.g. for nucleic-acid analysis, protein analysis, or cell analysis. For example, in the device cells can be lysed and DNA can be purified by different washing steps in different chambers. These washing steps can, for example, be performed by allowing particles to penetrate the valve material, whereas a fluid or other particles are not allowed to penetrate the valve material, thereby separating certain particles from a fluid or from other particles.

The particles can be actuated through the valve material by any force. For example, the particles can be actuated through the valve material by magnetic forces, by electrical forces, by capillary forces, et cetera. Preferentially, the particles are magnetic particles, which are forced through the valve material by using a magnetic actuation unit, which is or comprises a magnetic field generation unit for generating magnetic forces for actuating the magnetic particles through the valve material. The magnetic field generation unit is, for example, a magnet like a permanent magnet or an electro magnet, or a current wire.

It is preferred that the first region and the second region comprise a hydrophilic surface.

It is further preferred that the multi-region device as claimed in claim 10, wherein the multi-region device comprises a layer having a surface with hydrophilic regions defining the first and second regions, wherein the valve region comprising the valve material is located between the hydrophilic regions.

The layer is preferentially a substrate like a glass or plastic substrate having a surface with hydrophilic regions defining the first and second regions and a hydrophobic region located between the hydrophilic regions, wherein the hydrophobic region is the valve region comprising the valve material. The layer having the surface with hydrophilic regions and preferentially with a hydrophobic region being the valve region is preferentially a part of a casing, wherein a first hydrophilic region on the layer defines a first chamber, a second hydrophilic region on the layer defines a second chamber and wherein the hydrophobic region defines the valve region comprising the valve material.

In a further aspect of the present invention a particles actuating device is provided, wherein the particles actuating device comprises a multi-region device receiving region for receiving a multi-region device as defined in claim 9, the particles actuating device being adapted to actuate particles located in the first region to move in the direction of the second region, if the multi-region device is located in the multi-region device receiving region, for transferring the particles from the first region to the second region through the valve.

This allows providing the multi-region device as a disposable device and the particles actuating device as a reusable device. The particles actuating device can comprise further functionality like a unit for analyzing a fluid and/or the particles.

Preferentially, the particles actuation device also comprises the valve control unit for controlling the degree of penetrability of the valve. For example, the particles actuation device comprises a heating element for modifying the temperature of the valve material and a heating element control unit for controlling the temperature of the valve material. The particles actuating device can further comprise a temperature sensor for sensing the temperature close to the valve material such that the temperature can be controlled by controlling the heating element depending on the measured temperature. The heating element, the heating element control unit and preferentially the temperature sensor form a valve control unit.

In a further aspect of the present invention a method for manufacturing a valve for controlling a passage of particles from a first region to a second region is presented, wherein the method comprises the steps of:
- providing a valve material having a modifiable degree of penetrability,
- providing a valve region,
- arranging the valve material in the valve region and adapting the valve region and the valve material such that the particles have to penetrate the valve material if the particles pass the valve for being transferred from the first region to the second region.

In a further aspect of the present invention a method for manufacturing a multi-region device is presented, wherein the method comprises the steps of:
- providing a first region and a second region,
- providing a valve as claimed in claim 1,
- arranging the valve between the first region and the second region for controlling a passage of particles from the first region to the second region.

It is further preferred that the steps of providing a first region and a second region and arranging the valve between the first region and the second region are performed by
- providing a first layer comprising hydrophilic and hydrophobic regions on its surface,
- providing water and the valve material on the surface such that the water is arranged at the hydrophilic regions and the valve material is arranged at the hydrophobic regions.

In a further example a fabrication method is claimed, whereby at least one hole is provided in the first layer or in the second layer and the valve material is applied to the valve through the hole.

In a further example a fabrication method is claimed wherein at least a channel perpendicular to the transfer direction of the particles is provided at which end the hole is arranged, the channel crossing the transfer direction and the particles are transferred through the channel by capillary forces.

Both methods above provide a less complicated fabrication, especially by filling the valve material into the valve through the provided hole.

It shall be understood that the valve of claim 1, the multi-region device of claim 6, the particles actuating device of claim 8, the method for manufacturing a valve of claim 9 and the method for manufacturing a multi-region device of claim 10 have similar and/or identical preferred embodiments as defined in the dependent claims.

It shall be understood that a preferred embodiment of the invention can also be any combination of the dependent claims with the respective independent claim.

DETAILED DESCRIPTION OF EMBODIMENTS

Figure 1:
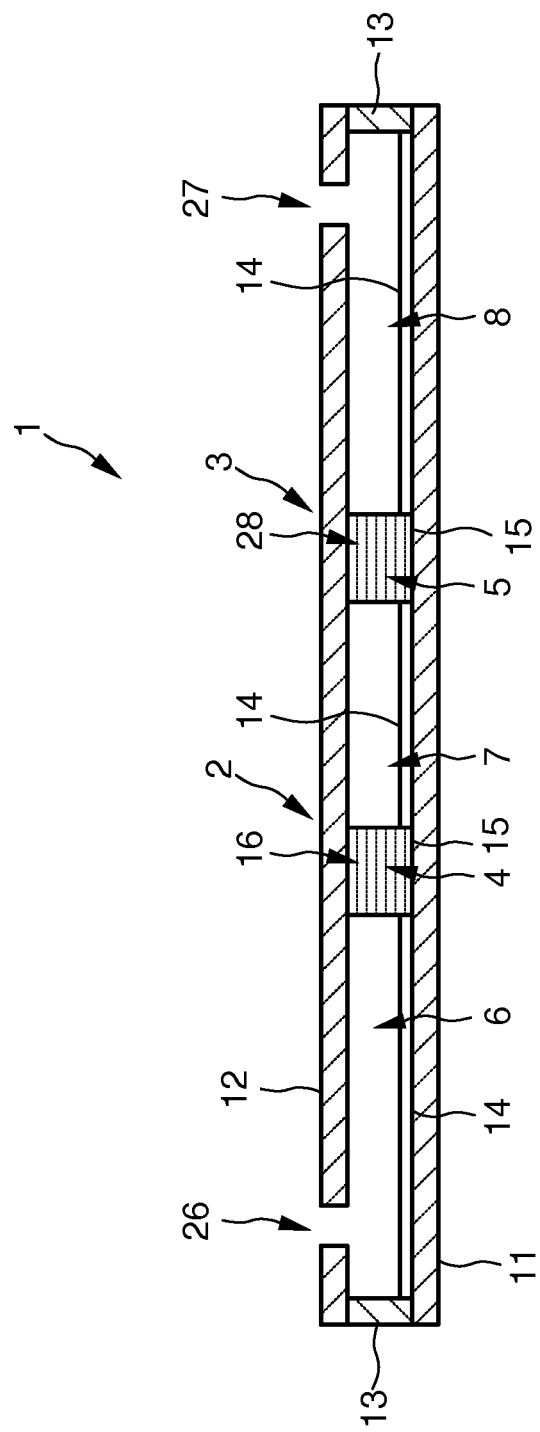
FIG. 1 shows schematically and exemplarily an embodiment of a multi-region device.

FIG. 1 shows schematically and exemplarily an embodiment of a multi-region device 1 comprising a first region 6 and a second region 7. A valve 2 is arranged between the first region 6 and the second region 7 for controlling a passage of particles from the first region 6 to second region 7. The multi-region device is preferentially a multi-chamber diagnostic device.

The multi-region device 1 comprises a first layer 11 being a glass or plastic substrate and an opposite second layer 12 also being a glass or plastic substrate.

The multi-region device further comprises constraining elements 13 forming walls for constraining a fluid within the multi-region device 1. In this embodiment, the multi-region device 1 further comprises a further valve 3, wherein the layers 11, 12, the constraining elements 13 and the valves 2, 3 form several chambers defining the first region 6, the second region 7 and an analysing region 8.

The second layer 12 comprises an inlet opening 26 allowing a fluid to be introduced into the first region 6 and an outlet opening 27 allowing a gas like air and/or the introduced fluid to leave the multi-region device.

The valves 2, 3 comprise a valve material 4, 5 having a modifiable degree of penetrability, wherein the valve material 4, 5 is arranged within a valve region 16, 28 such that particles have to penetrate the valve material 4, 5, if the particles pass the valves 2, 3 for being transferred from the first region 6 to the second region 7 or from the second region 7 to the analysing region 8, respectively. Since the degree of penetrability of the valve material 4, 5 is modifiable and since the valve material 4, 5 is adapted such that particles have to penetrate the valve material 4, 5 if particles pass the valve 2, 3 for being transferred from the first region 6 to the second region 7 or from the second region 7 to the analysing region 8, the degree of opening of the valve 2, 3 can easily be controlled by modifying the degree of penetrability of the valve material 4, 5.

Preferentially, a fluid comprising magnetic particles is introduced into the first region 6 of the multi-region device 1 through the inlet opening 26. Then the valve material 4 and also the valve material 5 are preferentially adapted and controlled such that a) the magnetic particles can penetrate the valve material for allowing the magnetic particles to be transferred from the first region 6 to the second region 7 and from the second region 7 to the analysing region 8, respectively, and that b) the fluid can substantially not penetrate the valve material 4 or the valve material 5. This allows separating the magnetic particles from the fluid present in the first region 6.

The magnetic particles are preferentially actuated by a magnetic field, which forces the magnetic particles through the valve material 4, 5, if the degree of penetrability of the valve material 4, 5 is controlled such that the magnetic particles can penetrate the valve material 4, 5. The actuation of the magnetic particles by the magnetic field will be described in more detail further below.

The degree of penetrability of the valve material 4, 5 is preferentially modifiable with respect to particles having a diameter between 3 nm and 10000 nm, further preferred between 10 nm and 5000 nm, and even further preferred between 50 nm and 3000 nm.

The valves 2, 3 further comprise a valve control unit for controlling the degree of penetrability of the valve material 4, 5. The valve control unit can be completely integrated into the multi-region device or it can be integrated in another separate device like a particles actuating device, wherein the other external device and the multi-region device cooperate for controlling the degree of penetrability. Furthermore, a first part of the valve control unit can be integrated in the multi-region device and a further part of the valve control unit can be integrated in the further external device. A further external device being a particles actuating device, which comprises the valve control unit, is schematically and exemplarily shown in FIG. 2.

Figure 9:
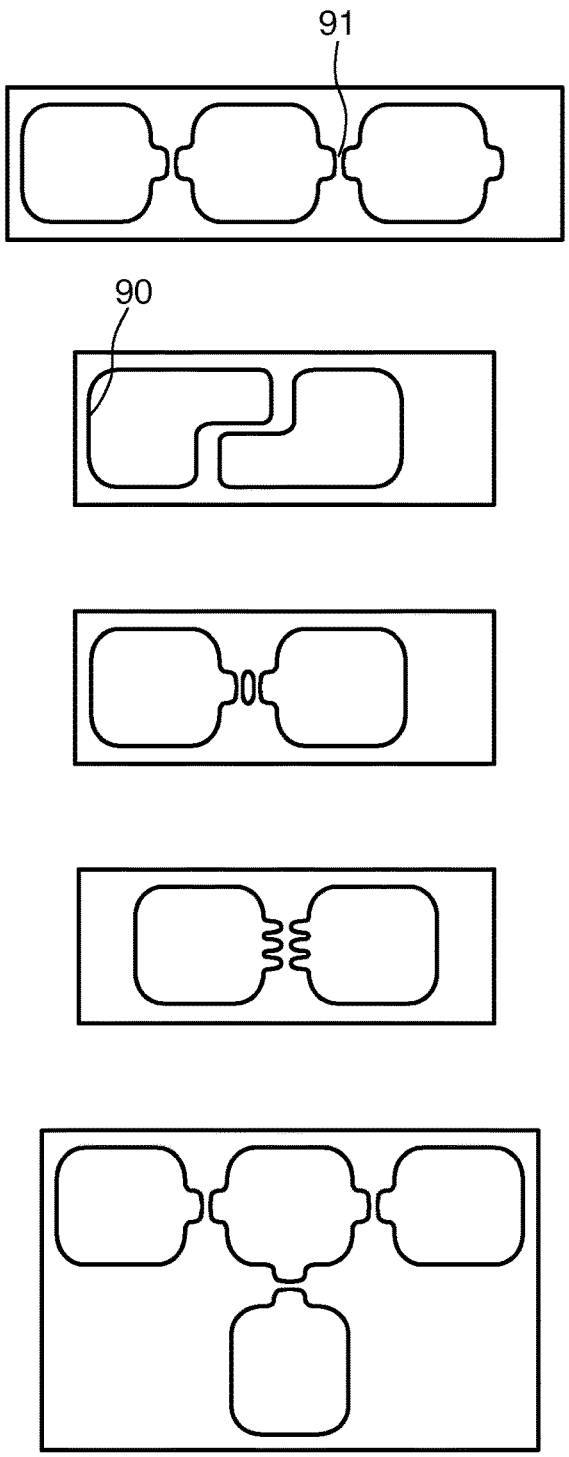
FIG. 9 shows schematically and exemplarily different distributions of hydrophilic and hydrophobic regions of a multi-region device.

The particles actuating device 9 comprises a multi-region device receiving region 10 for receiving a multi-region device. In the situation shown in FIG. 9, the multi-region device 1 has been introduced into the multi-region device receiving region 10 of the particles actuating device 9. The particles actuating device 9 is adapted to actuate magnetic particles located in the first region 6 to move in the direction of the second region 7, if the multi-region device 1 is located in the multi-region device receiving region 10, for transferring the particles from the first region 6 to the second region 7 via the valve 2. The particles actuating device 9 is further adapted to actuate particles located in the second region 7 to move in the direction of the analysing region 8, if the multi-region device 1 is located in the multi-region device receiving unit 10, for transferring the particles from the second region 7 to the analysing region 8 via the valve 3. For forcing magnetic particles from the first region 6 to the second region 7 through the valve 2 and from the second region 7 to the analysing region 8 through the valve 3 the particles actuating device 9 comprises a magnetic actuating means 19 being controlled by a control unit 18. Preferred implementations of the magnetic actuating means 19 will be described further below.

The particles actuating device 9 further comprises heating elements 17, 29 for modifying the temperature of the valve materials 2, 3. The heating elements 17, 29 are controlled by the control unit 18 such that the control unit 18 and the heating elements 17, 29 form a valve control unit. By controlling the temperature of the valve material 4, 5 at least one of the phase and of the viscosity of the valve material 4, 5 is controlled, thereby controlling the degree of penetrability of the valve material 4, 5 with respect to the magnetic particles.

In this embodiment, the valve material 4, 5 and the valve control unit 17, 29, 18 are adapted such that the valve material 4, 5 is switchable between a solid state in which the degree of penetrability with respect to the magnetic particles is reduced and a liquid state, in which the degree of penetrability with respect to the magnetic particles is increased. Preferentially, in the solid state the magnetic particles and preferentially also a fluid, in which the magnetic particles might be dispensed, cannot penetrate the valve material 4, 5 and in the liquid state only the magnetic particles and not a fluid, in which the magnetic particles might be dispensed, can penetrate the valve material 4, 5.

The valve material 4, 5 is in the solid state preferentially under storage temperatures, in particular, at/under room temperature of about 20° C. The valve material 4, 5 is preferentially meltable and is preferentially a wax like paraffin or polyethyleneglycol.

Preferentially, the valve material 4, 5 is hydrophobic, in order to minimize the risk that an aqueous liquid can mix up with the valve material 4, 5, if the valve material 4, 5 is in the liquid state. In another embodiment, in which the multi-region device is adapted for being used with hydrophobic, in particular, oily, liquids, the valve material is preferentially made of a hydrophilic material, in order to minimize the risk of mixing the valve material with the hydrophobic and, in particular, oily liquids, if the valve material is in the liquid state.

The valve material 4, 5 is preferentially chemically inert, i.e. the valve material 4, 5 does substantially not react with other elements contacting, in particular penetrating, the valve material 4, 5. This yields a long lifetime of the valve material 4, 5 and, thus, of the valves 2, 3.

The particles actuating device 9 further comprises an analysing unit 21 for analysing the particles, which have finally reached the analysing region 8 of the multi-region device 1. The analysing unit 21 can, for example, be adapted to determine the amount or concentration of magnetic particles in the analysing region 8 optically or magnetically. Also the analysing unit 21 is preferentially controlled by the control unit 18.

Referring again to FIG. 1, the multi-region device 1 further comprises a surface with hydrophilic regions 14 on the first layer 11 in the first and second regions 6, 7 and in the analysing region 8 and hydrophobic regions 15 on the first layer 11 in the valve regions 16, 28. Thus, the first and second regions 6, 7 and the analysing region 8 are defined by hydrophilic regions 14 and the valve regions 16, 28 are defined by hydrophobic regions 15. Since the first layer 11 comprises these hydrophilic and hydrophobic regions 14, 15 and since the valve material is preferentially immiscible and inert with respect to water, the different regions within the multi-region device 1 can easily be manufactured by applying water and the valve material 4, 5 to these regions. The water will substantially only be arranged at the hydrophilic regions 14, allowing the valve material 4, 5 to be located substantially at the hydrophobic regions 15 only. Thus, the valve 2, 3 can easily be manufactured by providing hydrophobic and hydrophilic regions 14, 15, by applying water and the valve material 2, 3 in a fluidic state to the hydrophobic and hydrophilic regions 14, 15, and by modifying the state of the valve material 4, 5 such that it becomes solid. After the valve material 4, 5 has become solid, the water is removed, wherein the first and second regions 6, 7 and, in this embodiment, also the analysing region 8, and the valve regions 16, 28 comprising the valve material 4, 5 remain.

The multi-region device 1 is preferentially a diagnostic device being preferentially compact, robust and adapted such that only a few user-aided steps are required. Preferentially, a user only needs to add a sample like a sample of blood or saliva to the multi-region device and all other reagents that might be necessary for analysing the sample, are already present in the multi-region device. The multi-region device is preferentially a cartridge being disposable such that the multi-region device is only used one time, whereas the particles actuating device can be used several times.

If reagents have to be present in the multi-region device, these reagents are preferentially present in a dry form, because wet reagents carry the risk of leaking and drying out, in which case it is difficult to control the concentrations of the reagents in a final assay. Dry reagents do not move or leak out and can be very stable in the multi-region device.

The valve material can be a fluid like a gas or a liquid, or a solid. A valve material being solid under storage temperatures like room temperature of about 20° C. and being solid in a state, in which the particles cannot penetrate the valve material, has the advantage that the entire multi-region device can be very stable, because the valve material generally does not evaporate, diffuse or creep. Furthermore, if, for example, oil would be used instead of a valve material which is generally solid and preferentially only liquid, if the magnetic particles should penetrate the valve material, initially the oil wets the hydrophobic as well as the hydrophilic regions. Therefore, a pressure would be required to fill the multi-region device by a sample and/or reagent fluids, because the oil needs to be displaced. Moreover, an autonomous filling by capillary forces would be very difficult or not possible.

If the valve material is generally solid, the valve material can define capillary regions, in particular, capillary channels, which allow a sample fluid being forwarded within the multi-region by capillary forces for allowing an autonomous filling. In addition, the use of a valve material, which is generally solid and only in a liquid state if magnetic particles should penetrate the valve material, reduces the probability that dry reagents stored in the multi-region device are contaminated by the valve material. The valve material is therefore preferentially a material which is solid under storage temperatures of, for example, about 20° C. In particular, the valve material is preferentially a material, which is always solid and only liquid, if the particles should penetrate the valve material. Furthermore, the valve material is preferentially inert and immiscible with respect to the fluids, which are intended to be introduced into the multi-region device, in particular, with respect to water.

In the liquid state the valve material has preferentially different values of viscosity, for example, the valve material can be in a high-viscous state and in a low-viscous state. The valve material is preferentially immiscible and inert with respect to water irrespective of the current viscosity value of the valve material. In a low-viscous state, in which the valve material has preferentially a viscosity of about 1000 mPa·s (1000 cP), the valve material has in an example a low interfacial tension with water of about 0.06 N/m.

The valve material can be a valve material of which the visco-elastic properties can be modulated. The valve material provides preferentially a switchable barrier material located in the multi-region device being, for example, a multi-chamber diagnostic device. The degree of penetrability of the valve material by actuated magnetic particles is controlled by a physical modulation. In particular, as already mentioned above, the valve material is preferentially a meltable substance like paraffin of which the visco-elastic property is modulated by controlling the temperature of the valve material.

The valve material is, for example, a wax from the company Sigma-Aldrich. The valve material has preferentially a melting temperature, which is larger than 40° C., further preferred larger than 50° C. and even further preferred larger than 60° C. In an embodiment, the valve material has a melting temperature in the range of, for example, 44-46° C. or 53-57° C. In particular, the valve material is preferentially paraffin having a melting temperature in the range of 44-46° C. However, it is also possible to use a valve material having a lower melting temperature, for example, in order to be below a temperature at which reagents, which might be present within the multi-region device, evaporate or below a temperature at which sensitive material, which might be present within the multi-region device, is affected, like labile proteins. In an embodiment, the melting temperature is about 30° C. or smaller. A valve material having a small melting temperature allows to apply the heating for a short time only. For example, if a small melting temperature has to be reached, like, for example, 30° C., a melting of the valve material could be achieved in, for example, a few seconds. Thus, the valve could be switched in a very short time.

The first layer of the multi-region device is preferentially a bottom part being a plastic or glass substrate. In an embodiment, the first layer is a microscope glass slide on which a self-assembled monolayer (SAM) of perfluorodecyl-tri-etoxysilane is applied. The SAM is partly removed by oxygen plasma treatment, leaving a pattern of hydrophilic regions, which can be regarded as hydrophilic chambers, as islands in a hydrophobic background. The second layer is preferentially a top part being preferentially a plastic or a glass substrate. In an embodiment, the top part is an untreated slide of PMMA. The constraining elements are preferentially formed by a double-sided tape arranged between the first layer and the second layer. The double-sided tape has preferentially a thickness of about 100 µm. The valve material has preferentially been applied at a temperature above the melting temperature of the valve material, i.e. the valve material has preferentially been applied in a liquid state, while the hydrophilic chambers were filled with water. In particular, preferentially paraffin is applied at 50° C. as valve material, while the hydrophilic chambers are filled with water. In this way, the valve material only wets around the hydrophilic chambers. After cooling back to room temperature, the valve material solidifies and becomes opaque. A resulting distribution of different regions within a multi-region device is schematically and exemplarily shown in a top view in FIG. 3.

Figure 3:
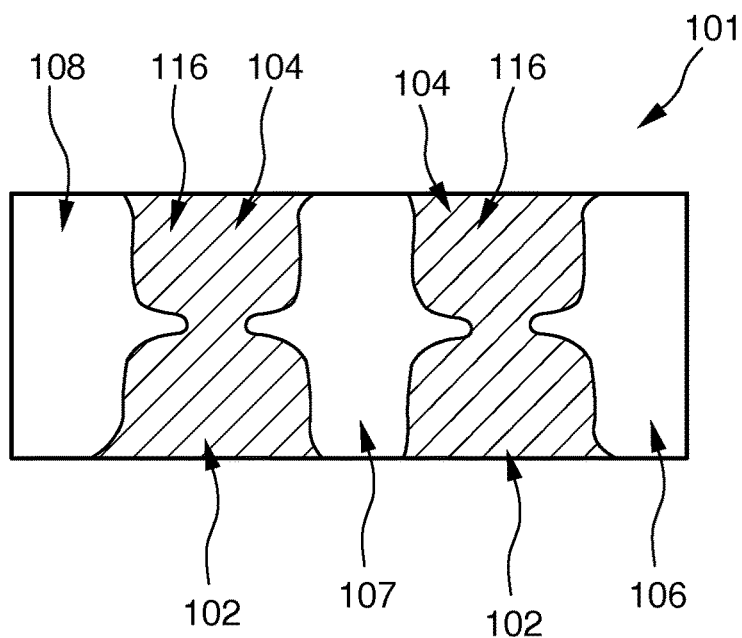
FIG. 3 shows schematically and exemplarily a top view on an embodiment of a multi-region device.

The distribution of different regions within the multi-region device 101 shown in FIG. 3 comprises the solidified valve material 104 in the hydrophobic valve regions 116, which form the valves 102. Between the hydrophobic valve regions 116 hydrophilic regions are present, i.e. a first region 106, a second region 107 and a third region 108. These regions 106, 107 and 108 define hydrophilic chambers, which are separated by the valve material 104 in the hydrophobic valve regions 116.

Figure 4:
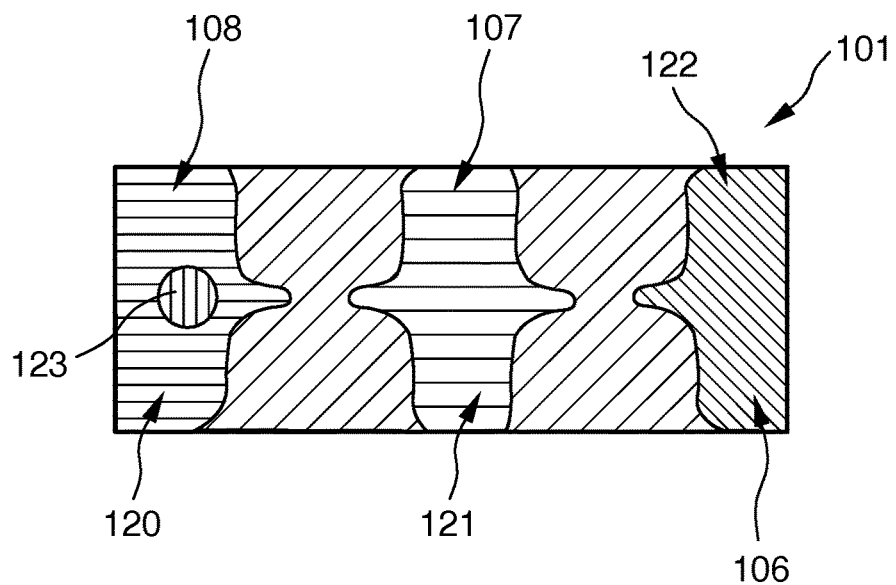
FIG. 4 shows schematically and exemplarily a top view on an embodiment of a multi-region device containing magnetic particles and a fluid.

FIG. 4 shows schematically and exemplarily a top view on the distribution of different regions within the multi-region device 101, wherein an ensemble of magnetic beads has been transported from the first region 106 to the third region 108. The magnetic beads being magnetic particles have been transported while the valve material, which is preferentially paraffin, was in the liquid phase, preferentially, at a temperature of about 50° C. After the valve material solidifies the valves are closed and the magnetic beads cannot leave the regions anymore.

The magnetic beads have been transported from the first region 106 towards the third region 108. The region 106 contains a solution 122 of super-paramagnetic beads being the magnetic particles in a phosphate buffered saline buffer (PBS) puffer. The region 107 contains water 121 dyed with cosmenyl blue. The region 108 contains pure water 120 and the ensemble 123 of magnetic beads that has been transported.

Figure 2:
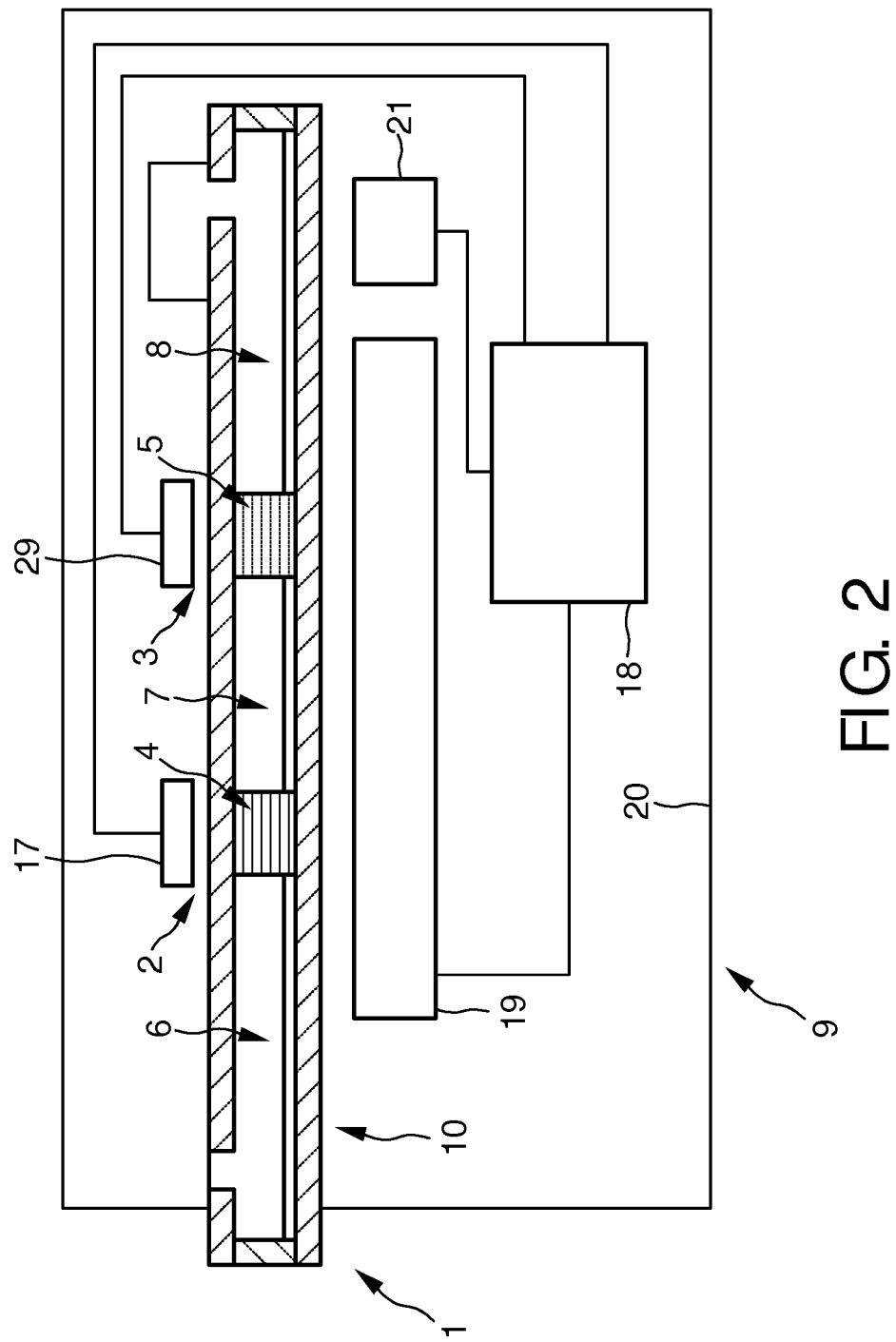
FIG. 2 shows schematically and exemplarily an embodiment of a particles actuating device in which the multi-region device has been introduced.

The heating performed by the heating elements, in particular, by the heating elements 17, 29, which are schematically and exemplarily shown in FIG. 2, can be applied by several methods. For example, the heating can be an electrical resistive heating or a heating by electromagnetic field or a magnetic-inductive heating or a heating by optical irradiation and absorption et cetera. The heating can be applied to the multi-region device as a whole or to very specific places, for example, only where and when magnetic particles need to pass through a valve material. The heating can be applied by an external device like the particles actuating device or by a heat source integrated in the multi-region device. Integrated heating can improve the spatial and temporal resolution of the modulation or modification of the degree of penetrability of the valve material. Furthermore, a heating can be applied only once, or several heating and cooling cycles can be applied.

Although in the above described embodiments paraffin is preferentially used as valve material, instead of paraffin any other material can be used of which a physical property can be modulated or modified such that the degree of penetrability of the valve material with respect to particles like the above mentioned magnetic particles can be modulated or modified. The valve material can be a single substance or a mixture more than one substance. For example, the valve material can be a mixture of paraffin with one or more other substances. In an embodiment, a surfactant like Brij 72 can be added to paraffin to decrease the interfacial tension with respect to water. Furthermore, the valve material like paraffin can be mixed with agents to tune its properties, for example, its density, its surface tension, its heat capacity, its light absorption et cetera.

The shape of the regions, in particular, the shape of the hydrophilic pattern, of the multi-region device can be adapted to facilitate capillary filling of the multi-region device and/or to facilitate crossing of the particles through the valve material of the valve of the multi-region device.

The degree of penetrability of the valve material, in particular, the phase and/or the viscosity and/or the viscoelastic property, of the valve material can be modified before filling of the multi-region device with a sample fluid or after the multi-region device has been filled with the sample fluid.

The valve is preferentially used in a multi-chamber micro fluidic device that requires a separation of chambers by a valve-like structure that is preferentially immiscible with water. More specifically, the valve is preferentially used in a multi-chamber microfluidic device for sample pre-treatment in nucleic-acid testing.

The term "valve" refers to an element for controlling the movement of particles like magnetic particles at least from a first region to a second region, wherein the first region and the second region are separated by the valve. The valve is therefore a device for regulating and/or controlling the transport of particles like magnetic particles from a first region to a second region. The term "valve" is not limited to a device for regulating the flow of the fluid.

Figure 5:
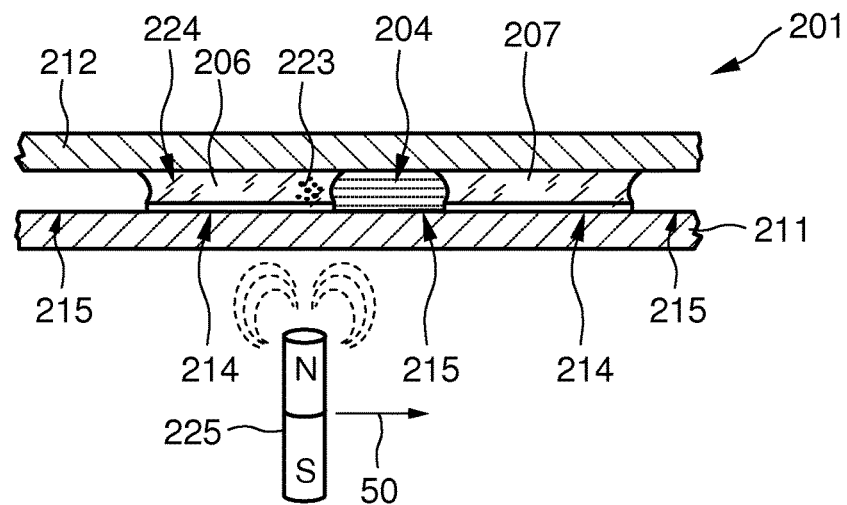
FIGS. 5 to 8 show schematically and exemplarily embodiments of magnetic actuating means for forcing magnetic particles through a valve material of a valve.

FIG. 5 illustrates an actuation of magnetic particles from a first region to a second region through a valve material. In this example, a first layer 211 being a first solid substrate has a patterned surface with hydrophilic regions 214 and hydrophobic regions 215. A second layer 212 being a second solid substrate has a fully hydrophobic surface. Between the hydrophilic regions 214 on the first layer 211 a valve region comprising a valve material 204 is formed. The space defined by the hydrophilic regions 214 on the first layer 211 is filled with a fluid sample like aqueous liquid 224, which is kept in position because it is encircled by hydrophobic surfaces. The fluid 224 on the left side in FIG. 5 additionally contains a cloud of magnetic particles 223. The magnetic actuation means is, in this example, a permanent magnet 225 being positioned beneath the boarder of the first hydrophilic region and the hydrophobic valve region 215 in FIG. 5. The presence of the magnetic actuating means causes the magnetic particles 223 to assemble in this region of the fluid sample 224. By moving the magnetic actuating means in the direction indicated by arrow 50 the magnetic particles 223 are forced to follow this movement and, thus, to be transferred through the valve material 204, if the valve material 204 is in a state, which allows the magnetic particles 223 to penetrate the valve material 204.

Although with respect to FIG. 5, a multi-region device has been exemplarily described, wherein the upper second layer being a top substrate comprises a hydrophobic surface, in another embodiment, the second layer can also comprise a hydrophilic surface facing the first layer.

Figure 6:
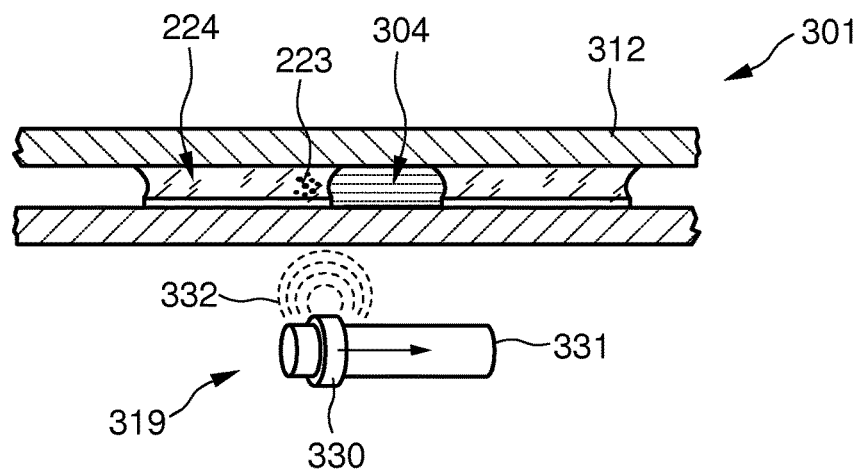
Figure 7:
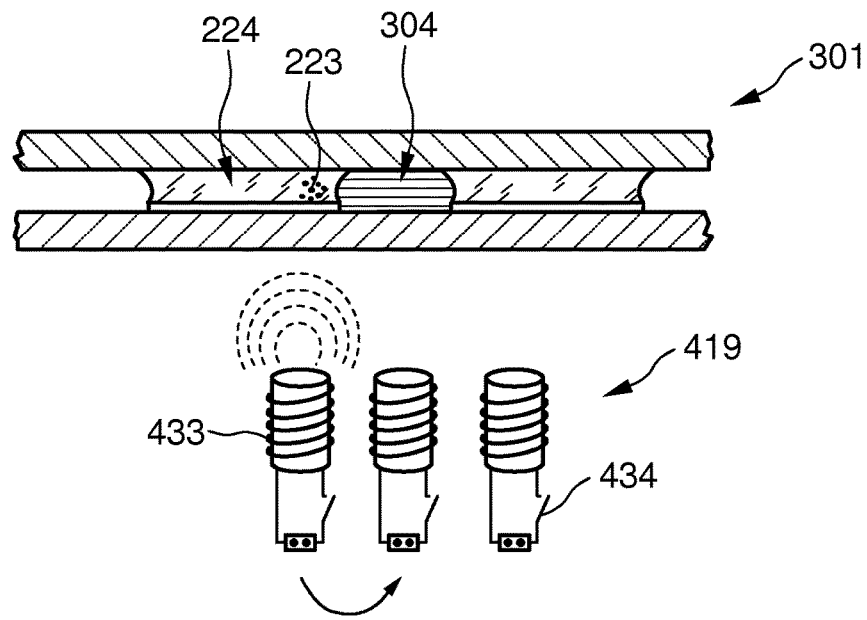
Figure 8:
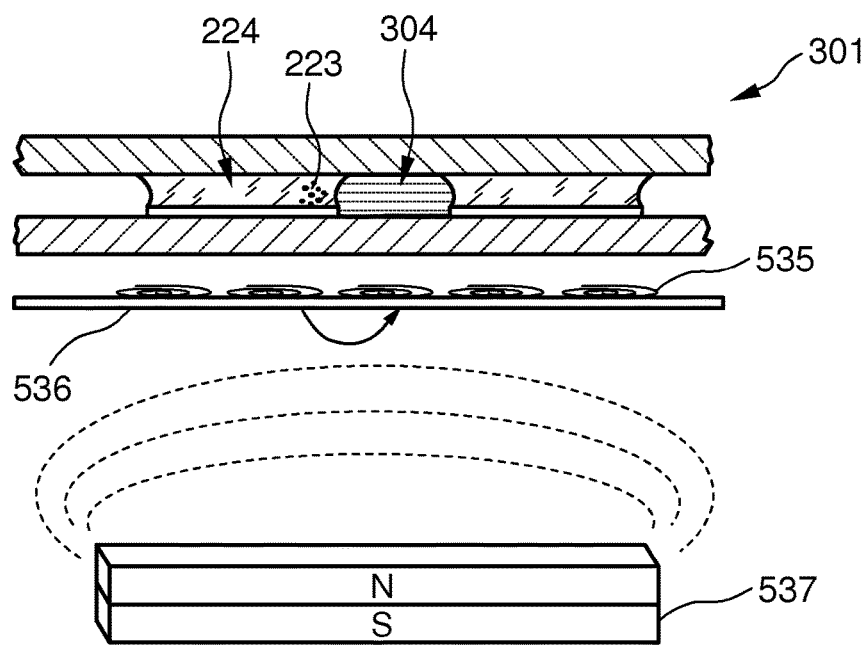

FIGS. 6 to 8 show exemplarily and schematically different embodiments of the magnetic actuation means being arranged beneath a multi-region device 301. The multi-region device 301 is similar to the multi-region device 201 shown in FIG. 5 with the difference that the second layer being a top substrate 312 comprises a hydrophilic surface facing the first layer, i.e. an inner hydrophilic surface.

In FIG. 6 the magnetic actuating means 319 comprises a travelling mechanism 331 like a rail which allows moving a magnet 330 in a parallel fashion with respect to the first and second layers of the multi-region device 301, thereby moving the magnetic field 332 and hence the magnetic particles 223 in the fluid 224 for forcing the magnetic particles 223 through the valve material 304.

FIG. 7 shows schematically and exemplarily a magnetic actuating means 419 comprising an array of electromagnets 433 which can be switched on and off in a coordinated fashion. The magnetic field thus travels via activating and deactivating the individual electromagnets 433 in a coordinated sequence. Switches 434 symbolize the switching mechanism, which is not limited to mechanical switches, but can also be semiconductor switches, like transistors, logical switches, or any other devices known from the art which allow a coordinated travelling of a magnetic field in an array of electromagnets.

FIG. 8 shows schematically and exemplarily a further embodiment of a magnetic actuating means 519 comprising an array of electromagnetic coils 535 disposed on a printed circuit board 536. Other than shown in FIG. 8, the array of electromagnetic coils 535 can be multi-layered. The electromagnetic coils can be switched on and off in a coordinated fashion. The magnetic field thus travels via activating and deactivating the individual coils in a coordinated sequence such that the magnetic particles 223 are forced through the valve material 304 from the first region to the second region. Moreover, the electromagnetic field is preferentially enhanced by a permanent magnet 537 which creates a static magnetic field. Also the permanent magnet 537 can be replaced by an electromagnet. The permanent magnet 537 cannot only be used to enhance the strength of the travelling magnetic field, but also to serve to magnetize the magnetic particles if necessary.

Although in the above described embodiments certain numbers and shapes of hydrophilic and hydrophobic regions, in particular, of hydrophilic regions which are separated by hydrophobic valve regions, have been described, the invention is not limited to a certain shape and number of these regions. For example, the multi-region device can also have the shape and number of the hydrophilic regions 90, which are separated by hydrophobic valve regions 91, as exemplarily illustrated in FIG. 9. Preferentially, the width of at least one hydrophobic region 91 is smaller than the widths of its neighbouring hydrophilic regions 90.

Figure 10:
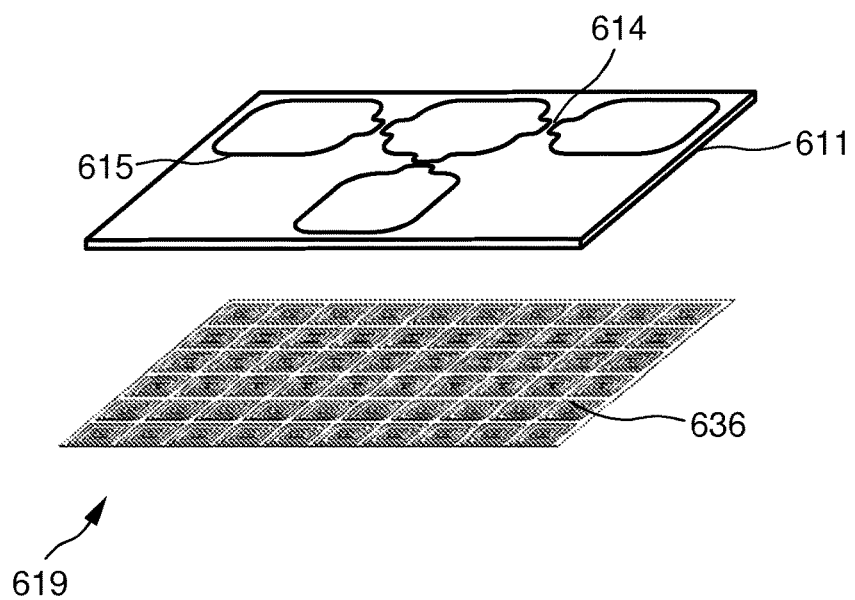
FIG. 10 shows schematically and exemplarily an exploded view of hydrophobic and hydrophilic regions of a multi-region device and of a magnetic actuating means.

FIG. 10 shows schematically and exemplarily a first layer 611 and a magnetic actuating means 619 in an exploded view. Further elements of the multi-region device are not shown in FIG. 10 for clarity reasons. Hydrophilic regions 615 for receiving a sample fluid are separated from one another by hydrophobic regions 614 comprising the valve material. The magnetic actuating means 619 comprises a printed circuit board 636 with an array of electromagnetic coils, which can be switched on and off in a coordinated fashion in order to create a travelling magnetic field.

Figure 11:
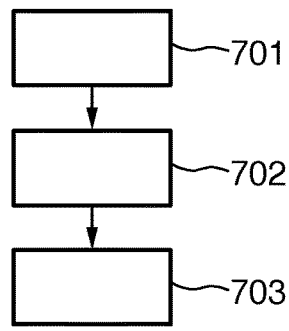
FIG. 11 shows exemplarily a flow chart illustrating a method for manufacturing a valve.

FIG. 11 shows exemplarily a flow chart illustrating an embodiment of a method for manufacturing a valve for controlling a passage of particles from a first region to a second region. In step 701, a valve material is provided, wherein the valve material has a modifiable degree of penetrability. In step 702 a valve region like a region on a substrate being a first layer is provided, and in step 703 the valve material is arranged in the valve region and the valve region and the valve material are adapted such that particles have to penetrate the valve material the particles pass the valve for being transferred from the first region to the second region.

Figure 12:
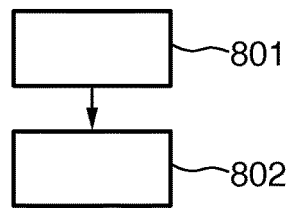
FIG. 12 shows exemplarily a flow chart illustrating a method for manufacturing a multi-region device.

FIG. 12 shows exemplarily a flow chart illustrating an embodiment of a method for manufacturing a multi-region device.

In step 801a first region and a second region are provided, preferentially, on a first layer being preferentially a substrate made of glass or plastic like a microscope glass slide. This provision of a first region and a second region is preferentially performed by providing the first layer with hydrophilic and hydrophobic regions on its surface, wherein the hydrophilic regions define the first and second regions. This provision of hydrophilic and hydrophobic regions is preferentially performed by applying a SAM of perfluorodecyl-tri-ethoxysilane on the first layer. Then, the SAM is partly removed by, for example, oxygen plasma treatment, leaving a pattern of hydrophilic regions as islands in a hydrophobic background, thereby creating hydrophilic and hydrophobic regions, which can also be regarded as hydrophilic and hydrophobic chambers.

In step 802, a valve is provided having a valve material with a modifiable degree of penetrability, wherein the valve, i.e. the valve material, is arranged between the first region and the second region for controlling a passage of particles from the first region to the second region. This provision of the valve, i.e. of the valve material, is preferentially performed by providing water and the valve material on the hydrophilic and hydrophobic regions such that the water is arranged at the hydrophilic regions and the valve material is arranged at the hydrophobic regions. This provision of the water and the valve material is performed, while the valve material is in the liquid state. After the water has been arranged at the hydrophilic regions and the valve material in the liquid state has been arranged at the hydrophobic regions, the valve material is solidified for providing the solidified valve material in the hydrophobic regions for forming the valve between the hydrophilic regions defining the first and second regions.

Although in the above described embodiments certain numbers of first and second regions and valves separating the first and second regions have been described, the invention is not limited to a certain number of valves and a certain number of first and second regions.

Although in the embodiment described above with reference to FIG. 2 the valve control unit is located within the particles actuating device, in other embodiments, at least parts of the valve control unit, for example, the heating elements, can be integrated in the multi-region device.

Although in the embodiment described above with reference to FIG. 2 a magnetic actuating means, a valve control unit and an analyzing unit are integrated in a single device, in another embodiment these functionalities can be distributed over several devices. For example, the particles actuating device can only comprise the valve control unit and the magnetic actuating means, and not the analyzing unit.

Although in the above described embodiments the actuating forces are magnetic forces, in other embodiments other forces can be used for forcing the particles through the valve material, for example, electrical forces, capillary forces, et cetera.

Although in an above described embodiment a self-assembled monolayer of perfluorodecyl-tri-ethoxysilane is applied on a substrate, wherein after this application the self-assembled monolayer is partly removed for generating a pattern of hydrophilic regions and hydrophobic regions, also other self-assembled monolayers are possible, for example, a self-assembled monolayer of perfluorodecyl-tri-chlorosilane is possible. Also other hydrophobic coatings can be patterned for generating hydrophilic and hydrophobic regions. Instead of a hydrophobic coating also a hydrophilic self-assembled monolayer or coating can be used, which is patterned for generating hydrophobic and hydrophilic regions.

The analyzing unit can be any suitable sensor to detect a signal that results from materials transported by the particles. For example, biological material (e.g. targeted material or analyte) may have been transported by the magnetic particles. By the analyzing unit, the biological material can be directly detected on the magnetic particles, or it can be further labelled and then detected, or it can be further processed and then detected. Examples of further processing are that biological material is amplified, or biological material is tagged or labelled, or material is released from the particles into solution for solution processing and/or detection, or that the (bio)chemical or physical properties of the labels are modified to facilitate detection, or that an enzymatic process is used for signal amplification.

The analyzing unit can also be any suitable sensor to detect the presence and/or concentration of magnetic particles on or near to a sensor surface, based on any property of the particles. For example, the analyzing unit can be adapted to detect the particles via magnetic methods (for example magneto-resistive, Hall, coils), optical methods (for example imaging, fluorescence, chemiluminescence, absorption, scattering, evanescent field techniques, surface plasma resonance, Raman et cetera.), sonic detection (for example surface acoustic wave, bulk acoustic wave, cantilever, quartz crystal et cetera.), electrical detection (for example conduction, impedance, and amperometric, redox cycling), and combinations thereof. If the magnetic particles are detected based on a magnetic property of the particles, the analyzing unit comprises preferentially a coil, a magneto-resistive sensor, a magneto-restrictive sensor, a Hall sensor, in particular, a planar Hall sensor, a flux-gate sensor, a SQUID, a magnetic resonance sensor or another magnetic sensor.

The multi-region device and preferentially also the analyzing unit can be adapted to perform molecule based assays, e.g. for nucleic-acid or protein detection, but, in addition to molecule based assays, also larger moieties can be detected, for example cells, viruses, or fractions of cells or viruses, tissue extract etc. The detection can occur with or without scanning of a sensor element of the analyzing unit with respect to a biosensor surface of the multi-region device. Measurement data can be derived as an end-point measurement, as well as by recording signals kinetically or intermittently. The magnetic particles are preferentially labels labelling the elements, which have to be detected, wherein the magnetic particles can be detected directly by the sensing method, or the particles can be further processed prior to detection. An example of further processing is that materials are added to the particles or released from the particles, or that the (bio)chemical or physical properties of the particles or materials on the particles are modified to facilitate detection. The multi-region device and preferentially also the analyzing unit can be used with several biochemical assay types, for example, binding/unbinding assay, sandwich assay, competition assay, displacement assay, enzymatic assay, amplification assay, et cetera. The multi-region device and preferentially also the analyzing unit are suited for sensor multiplexing (i.e. the parallel use of different sensors and sensor surfaces), label multiplexing (i.e. the parallel use of different types of labels) and chamber multiplexing (i.e. the parallel use of different reaction chambers). The multi-region device and the analyzing unit can be used as rapid, robust, and easy to use point-of-care biosensor for small sample volumes. The analyzing region, which could be regarded, in an embodiment, as a reaction chamber, can be a disposable item, i.e. the multi-region device can be used as a disposable item, to be used with a compact reader, containing one or more magnetic field generating means and one or more detection means like the analyzing unit. The reader is, for example, the above described particles actuating device. The multi-region device and preferentially the analyzing unit can be used as an automated high-throughput testing. In this case, the multi-region device comprises the analyzing region and the multi-region device fits into a reusable reader for analyzing the particles.

The particles have preferentially a diameter between 3 nm and 10000 nm, further preferred between 10 nm and 5000 nm, and even further preferred between 50 nm and 3000 nm.

Figure 13:
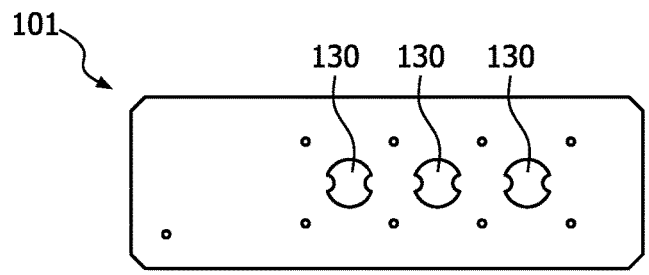
FIG. 13 shows a top view of a layer of a multi-region device provided with holes.
Figure 14:
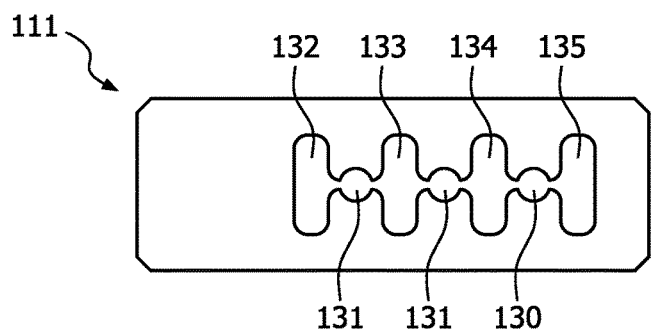
FIG. 14 shows a top view of a double-sided adhesive tape for applying onto the layer of FIG. 13.
Figure 15:
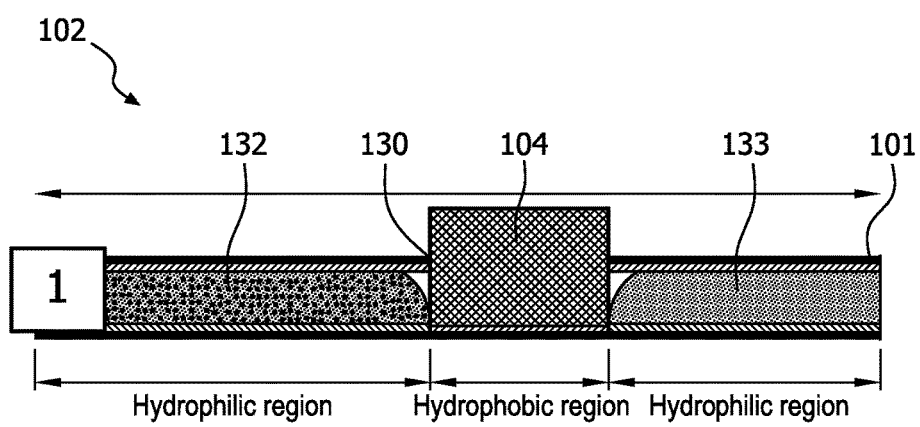
FIG. 15 shows a side view of a valve with a first region and a second region and the valve material applied between these regions through the hole according to FIGS. 13, 14, FIG. 16-18 show schematic top views of the multi-region device and an ensemble of particles being transferred from the second region to the first region through the valve material according to FIGS. 13-15.

In the following two fabrication methods are described in connection with FIGS. 13-18 and 19-23, respectively. FIG. 13 shows a schematic top view of a layer 101 forming part of the valve 102. Here, the valve 102 is designed as a multi-region device 1 with three holes 130 in the multi-region device 1. The layer 101 can be fabricated from glass for instance. FIG. 14 shows a double-sided adhesive tape 111 which has the same measures as the layer 101 and is formed to be applied to the layer 101. The tape can also be adhesive at only one side. The double-sided adhesive tape 111 has several oval regions 132-135 cut out which serve for application of hydrophilic material. Circular cut-outs 131 between the regions 132-135 are essentially congruent with the holes 130 at the layer 101. The cut-outs 131 and the regions 132-135 in the double sided layer 111 are connected to enable a flow of fluid between the regions 132-135 and the circular cut-out 131, as is shown in FIG. 14. When the layer 101 and the double-sided tape 111 are assembled the hydrophobic valve material 104 is applied through the holes 130 in the layer 101 and through the cut-outs 131 in the double-sided tape 111 in a further fabrication step. A schematic side view, FIG. 15, shows the valve 102 after applying the valve material 104 between the hydrophilic regions 132, 133. The valve 102 is hosted in a cartridge (not shown). The top layer is the layer 101 of FIG. 13, shown in FIG. 15 is one hole 130 through which the valve material 104 projects. Valve material 104, for example paraffin, is applied in a heated liquid form. The valve material 104 solidifies a soon as it touches the cartridge, which prevents the valve material 104 from flowing into the capillary space of the cartridge, the hydrophilic regions 132, 133. As a consequence, a well-defined plug of valve material 104 is deposited exactly at the valve region 131. It is to be noted that it is not essential that the valve region 131 is hydrophobic, since the valve material 104 stays in place anyway, due to its quick solidification. In a particular configuration of the valve 102 it is not necessary to design any pattern of hydrophilic or hydrophobic regions. This certain configuration leads to a simple fabrication of the valve 102 using paraffin as valve material 104. Any means of heating is possible, in an example the heating was provided by integrated thin film heaters of AlTi that are evaporated at the bottom at the outside of the cartridge. The regions 132, 133 are shaped as cut-outs in the double-sided tape 111 in which cut-outs the hydrophilic material is stored. A mask (not shown) is provided to pattern one of the layer 101 or the double sided tape 111 with hydrophilic or hydrophobic regions in one or several fabrication step.

Figure 16:
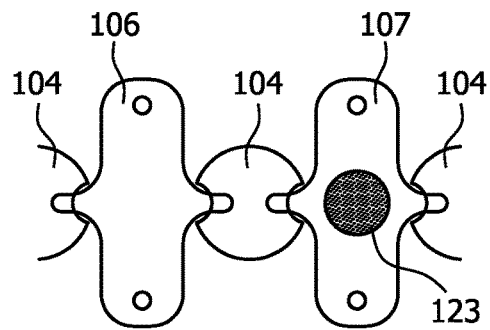
Figure 17:
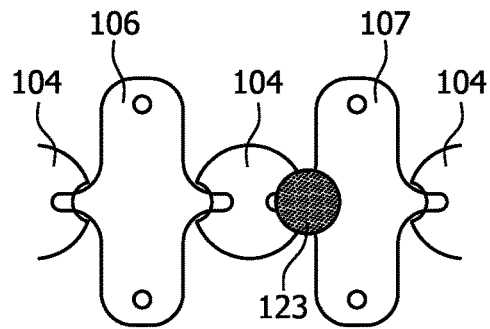
Figure 18:
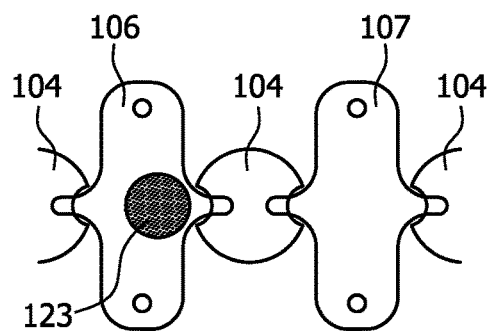

The FIGS. 16-18 show in a schematic way a top view on the operating mode of the valve 102. Shown are the first region 106 at the left and the second region 107 at the right which serve as reservoirs for fluids and magnetic particles. Between the first region 106 and the second region 107 the valve material 104 is arranged. As is described below the particles cross through the barrier of the valve material 104 from one second region 107 to the first region 106. Reservoir of first region 107 contains PBS buffer, reservoir of second region 106 contains L6 buffer containing 100 mM Triton X-100. First, an ensemble 123 or cloud of magnetic particles is hosted in the second region 107, whereas a transport to the first region 106 into a different reservoir is intended. A heater arranged at the valve material 104 heats the valve material 104 to the end that it melts. When partly or completely melted the valve material 104 becomes permeably for the ensemble 123 of particles, whereas before in solid form the valve material is a not passable stop. Capillary forces drag the ensemble 123 in the direction of the valve material 104 from the right to the left as shown in FIG. 16. In FIG. 17 the valve material 104 is partly or completely molten and the particles can now start to move through the valve material 104 as it is permeable for the particles when molten. The ensemble 123 of particles move through the valve material 104 and enters the first region 106, which is a hydrophilic region. FIG. 18 shows the ensemble 123 completely traversed into the first region 106. Further movements of the particles along adjacent regions are applicable, as the multi-region device 1 is not limited to two regions 106, 107. This is depicted by parts of further valve material 104 subsequent to the regions 106, 107 at the edge of FIGS. 16-18. It is noted that a superfluous volume of valve material 104 extends above the valve 102, as can be seen in FIG. 15, the amount of valve material 4 does thus not necessarily be applied exactly. After solidification of the valve material 104 the superfluous extending valve material 104 can be removed.

Figure 19:
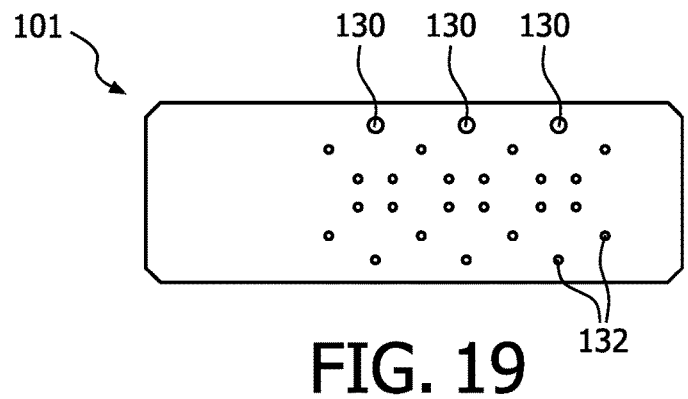
FIG. 19 shows a schematic top view of an alternative layer of a multi-region device provided with holes at the top of the layer.
Figure 20:
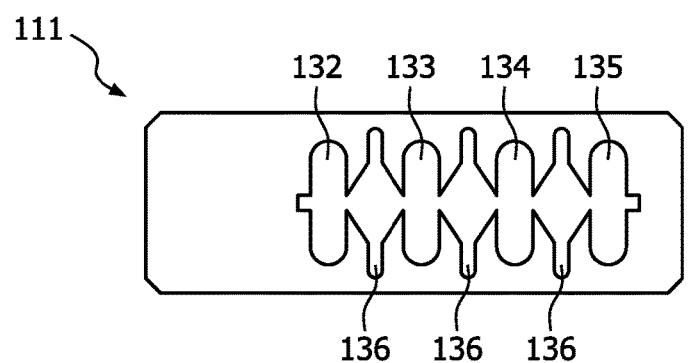
FIG. 20 shows a top view of an alternative double-sided adhesive tape for applying onto the layer of FIG. 19.
Figure 21:
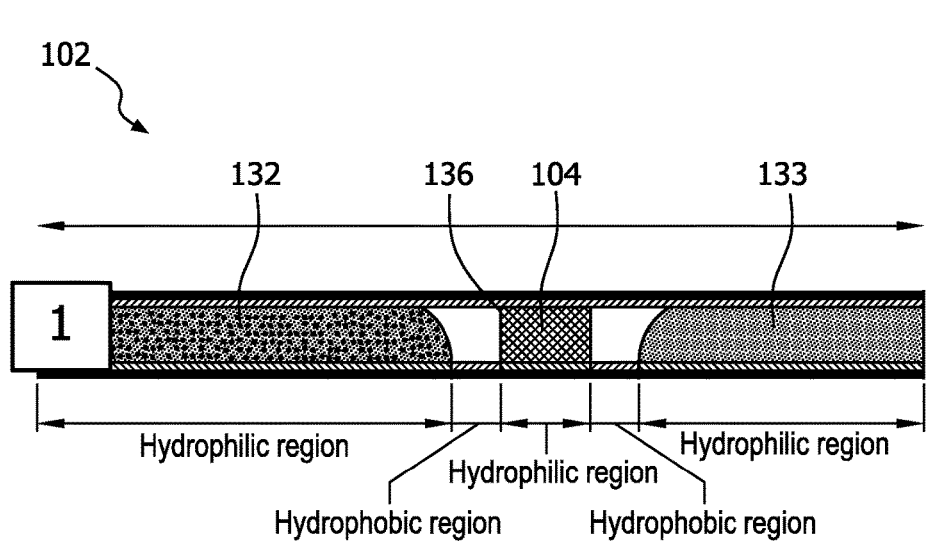
FIG. 21 shows a side view of a valve with a first region and a second region and the valve material applied between these regions through the hole according to FIGS. 19-20, FIGS. 22-24 show show schematic top views of the multi-region device and an ensemble of particles being transferred from the first region to the second region through the valve material according to FIGS. 19-21.

A different structure of a valve with an alternative fabrication method is described in the following under FIGS. 19-21 and further under FIGS. 22-24. Similar to the fabrication method described above a top substrate is provided, FIG. 19, denominated as layer 101 which has holes 130 projecting through the layer 101. Further, venting holes 132 are provided in the layer 101 which is fabricated from glass in this example. The venting holes 132 make sure that the aqueous liquid in the reservoirs of the regions 132-135 flows towards the barrier in the guides 136 provided by the valve material 104. Venting holes 132 further avoid that air bubbles are obstructing the passage of the cloud of magnetic particles. Similar to the fabrication method above a double-sided tape 111 is provided with oval regions 132-135, between which guides 136 are arranged partly formed as channels which spread in the direction to the opening of the regions 132-135, as is shown in FIGS. 19-21. Layer 101 and double-sided tape 111 having corresponding sizes are attached in a fabrication step building a structure according to FIG. 21. The holes 130 in the layer 101 for filling in valve material 104 to the valve 102 are positioned at one end of the guides 136 of the double-sided adhesive tape 111. The valve material 104 applied through the holes 130 is dragged by capillary forces along the guides 136 substantially to the middle of the guides 136 building a barrier between the regions 132-135. Similar to the fabrication step in the above example a mask (not shown) is provided to pattern one of the substrates, the layer 101 or the double-sided tape 111, with hydrophilic or hydrophobic regions. FIG. 21, finally, shows a schematic side view similar to FIG. 15 upon application of the valve material 104 being assembled completely to build the valve 102. The distribution of hydrophobic and hydrophilic regions is different in the example of FIG. 21 compared to the example of FIG. 15. The regions 132, 133 at the edges are hydrophilic similar to FIG. 15, two areas between the regions 132, 133 and the valve material 104 are hydrophobic. The region in the centre of the valve 102 containing the valve material 104 is hydrophilic in the contrary to the example of FIG. 15. This means a hydrophilic pattern in the centre is provided within the hydrophobic regions 132-135 around the hydrophilic region. Again, the valve material 104, for example liquid paraffin, of elevated temperature is applied through the holes 130 at one end of the hydrophilic pattern while the cartridge encompassing the valve is at an elevated temperature. The valve material can be applied in either liquid or solid phase, e.g. as pellet, as long as the cartridge hosting the valve 102 is heated at some time during fabrication. There is only a small volume of valve material 104 in a short time to be heated, and the transport of particles through the valve 102 is thus fast, with other words the switching time of the valve 102 is fast. Upon heating the valve material 104 remains confined to the hydrophilic region within the hydrophobic region and does not leak out of the region shown in FIG. 21. The valve material 104 falls into the capillary space following the hydrophilic pattern in the middle of FIG. 21 towards a venting hole 132. It is important to use a volume of valve material 104 that is smaller than the capillary volume above the hydrophilic region, because this measure ensures that when no more valve material 104 is available the flow will stop. After cooling the cartridge or the valve 102 a volume of solid valve material 104 is present on top of the hydrophilic region in the centre of the guides 136 that exists within the hydrophobic region around the centre. When storing the cartridge with the valve 102 described the storage temperature is not critical and does not have a negative effect on the functioning of the valve 102 as no valve material 104 leaks out.

Figure 22:
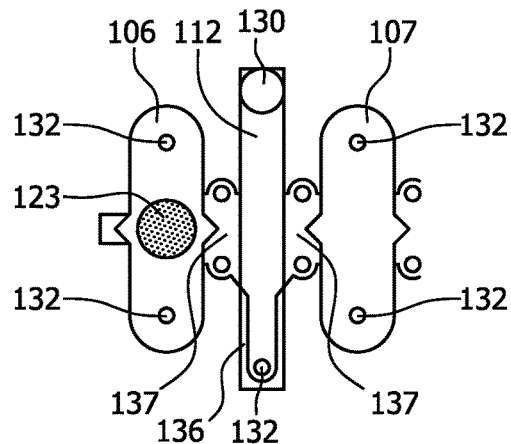
Figure 23:
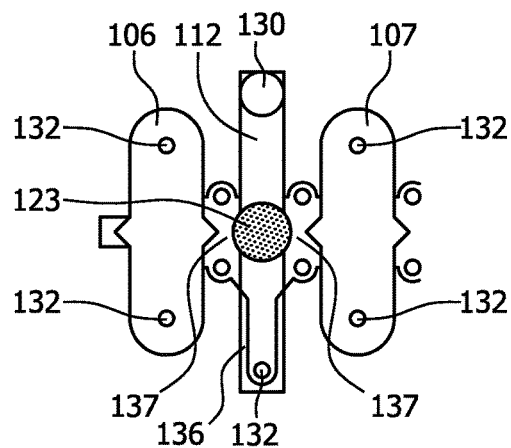
Figure 24:
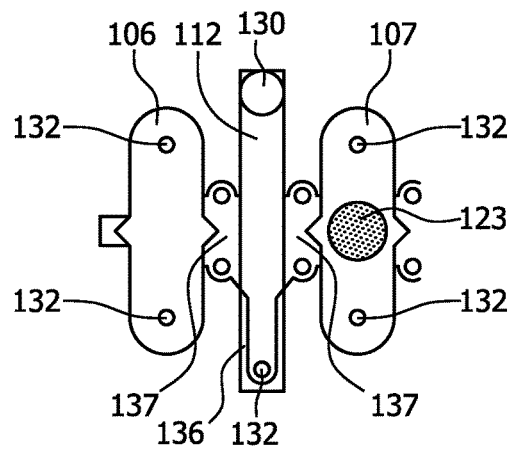

FIGS. 22-24 show schematic top views of the valve similar to FIGS. 16-18 for the second fabrication method described under FIGS. 19-21. FIGS. 22-24 show the functioning of the valve 102 of FIG. 21 in a top view. Oval regions 106, 107 are designed as reservoirs for holding fluids. Between the regions 106, 107 a guide 136 projects substantially parallel to the regions 106, 107. Between the regions 106, 107 and the guide 136 intermediate regions 137 are designed, as shown in FIGS. 22-24. As visible in FIGS. 22-24 the valve material 104 is applicable through the hole 130 at one end of the guide 136 and traverses along the complete guide 136 where the valve material 104 functions as a barrier for the fluid in the regions 106, 107 in solid form and functions as a transport means in liquid form in operation. Similar to the operation of the valve 102 above the ensemble 123 of magnetic particles is housed in the reservoir at the first region 106 first, FIG. 22. In operation, when transport of the ensemble 123 is intended, the valve material 104 is heated and melts as a result. By melting the valve material 104 gets permeable for the ensemble 123 which is dragged by capillary forces or alternatively by magnetic forces in the right direction as in the example of FIGS. 22-24. In FIG. 23 the particles have traversed the intermediate region 137 into the guide 136. Finally, the particles of the ensemble 123 are arrived in the second region 107 in FIG. 24.

Figure 25:
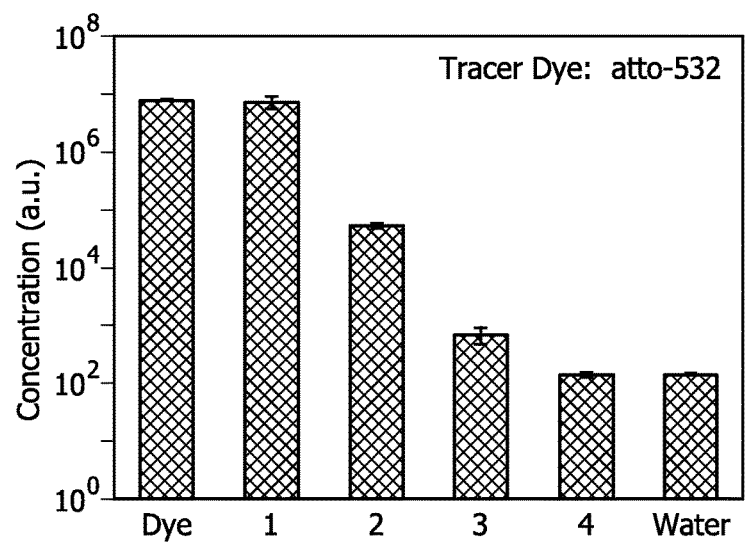
FIG. 25 shows a histogram with a concentration of a fluorescent tracer dye in the chambers of a valve of an example of the invention in a purification procedure.

In the following examplary test results are described by means of FIGS. 25 and 26. Investigated are the valving efficiency of the valve 2, 102 by monitoring the concentration of a fluorescent tracer in a purification procedure. A solution with magnetic particles and a high concentration of fluorescent dye was injected in the first region 6, 106 or chamber, while the other regions 7, 107 or chambers were filled with pure water. The particles were magnetically transferred from the first region 6, 106 to the second region 7, 107 with a 30 sec magnetic mixing motion in each region 6, 106, 7, 107. The concentration of the fluorescent dye was measured off-chip for each region 6, 106, 7, 107. FIG. 25 shows that the dye concentration decreases by a factor of around 100 for each crossing of particles over a magneto-capillary valve, which demonstrates the potential for very efficient purification in our microtechnology. Here, from the left to the right of FIG. 25 the bars of the histogram represent the concentration of dye after passing another valve 2, 102. Bar denoted with number 2 represents the concentration after passing of a first valve 2, 102, bar denoted with number 3 represents the concentration after passing of a second valve 2, 102 thereafter and so on. Further, in FIG. 25 the last bar at the right, denoted with the term water, shows that the concentration of dye in the last chamber or region was not distinghuisable from the water background without dye.

Figure 26:
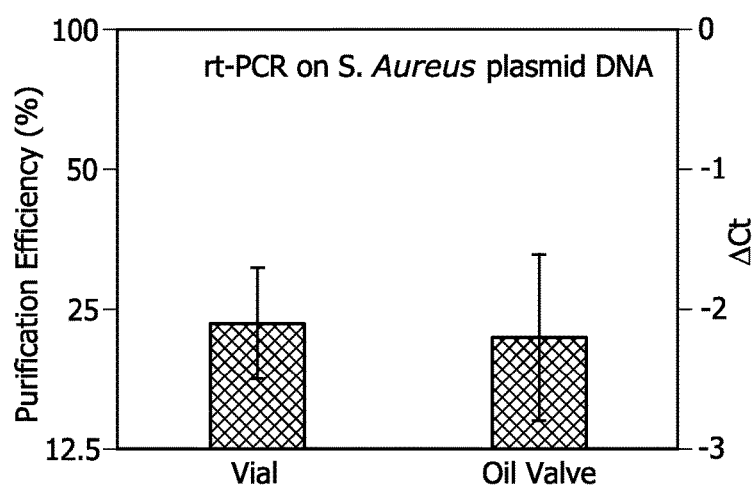
FIG. 26 shows a histogram with a comparison of purifications of a certain amount of copies of a certain DNA from a binding buffer.

FIG. 26 shows a histogram with a comparison of purifications of a certain amount of copies of a certain DNA from a binding buffer. Tests are on basis of 1000 copies of *S. Aureus* plasmid DNA from a binding buffer containing GuSCN. The bar at the left of FIG. 26 shows a purification efficiency of around 22% for a standard manual purification in vials. The bar at the right of FIG. 26 shows a purification efficiency of around 20% resulted from an examplary valve 2, 102 based on oil. Proven is that with the valve 2, 102 described a purification is reached which is comparable to a purification by manual standard methods.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or devices may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A valve for controlling a passage of particles, contained in a fluid in a first region, from the first region to a second region, the valve comprising:
    a valve material having a modifiable degree of penetrability; and
    a valve region comprising the valve material, wherein the valve region and the valve material are adapted such that the particles penetrate the valve material and pass through the valve from the first region to the second region when the valve material is in a penetrable state, enabling separation of the particles from the fluid.

2. The valve as claimed in claim 1, wherein the valve further comprises a valve control unit for controlling the degree of penetrability of the valve material.

3. The valve as claimed in claim 2, wherein the valve control unit is adapted to control at least one of phase and viscosity of the valve material for controlling the degree of penetrability, and the valve material and the valve control unit are adapted such that the valve material is switchable between a solid state in which the degree of penetrability is reduced and a liquid state, corresponding to the penetrable state, in which the degree of penetrability is increased.

4. The valve as claimed in claim 1, wherein the valve material is adapted such that the degree of penetrability of the valve material is temperature dependent.

5. The valve as claimed in claim 1, wherein the valve material is at least one of hydrophobic or inert with respect to water.

6. The valve as claimed in claim 1, wherein the valve material is hydrophilic.

7. A multi-region device comprising:
the first region and the second region;
the valve as claimed in claim 1, arranged between the first region and the second region.

8. The multi-region device as claimed in claim 7, wherein the multi-region device comprises a layer having a surface with hydrophilic regions defining the first and second regions, wherein the valve region comprising the valve material is located between the hydrophilic regions.

9. A particles actuating device comprising:
a multi-region device receiving region for receiving the multi-region device as claimed in claim 7; and
means for actuating particles located in the first region to move in a direction of the second region when the multi-region device is located in the multi-region device receiving region, for transferring the particles from the first region to the second region through the valve.

10. The particles actuating device as claimed in claim 9, wherein the particles contained in the fluid in the first region comprise magnetic particles, and
wherein the means for actuating the particles comprises a magnetic actuation unit configured to generate a moving magnetic field for moving the magnetic particles in the first region in the direction of the second region.

11. A method for manufacturing a valve for controlling a passage of particles, contained in a first region, from the first region to a second region, the method comprising:
providing a valve region; and
arranging a valve material, having a modifiable degree of penetrability, in the valve region and adapting the valve region and the valve material to enable the particles to penetrate the valve material and to pass through the valve from the first region to the second region when the valve material is in a penetrable state, for separating the particles from the fluid.

12. A method for manufacturing a multi-region device, the method comprising:
providing the first region and the second region; and
arranging the valve manufactured as claimed in claim 11 between the first region and the second region for controlling a passage of the particles from the first region to the second region.

13. The method as claimed in claim 12, wherein providing the first region and the second region, and arranging the valve between the first region and the second region comprise:
providing a first layer comprising a surface having hydrophilic and hydrophobic regions; and
providing water and the valve material on the surface such that the water is arranged at the hydrophilic regions and the valve material is arranged at the hydrophobic regions.

14. The method as claimed in claim 13, further comprising:
providing at least one hole in one of the first layer or the second layer; and
applying the valve material to the valve through the at least one hole.

15. The method as claimed in claim 14, further comprising:
providing a channel perpendicular to a transfer direction of the particles at an end of the first layer at which the hole is arranged, the channel crossing the transfer direction and the particles being transferred through the channel by capillary forces.

16. A particles actuating device, comprising:
a multi-region device comprising:
a first region providing a fluid containing particles;
a second region; and
a valve between the first region and the second region, the valve comprising a valve region including a valve material having a modifiable degree of penetrability, the valve region and the valve material being configured such that the particles of the fluid pass through the valve from the first region to the second region when the valve material is in a penetrable state, enabling separation of the particles from the fluid; and
means for actuating the particles located in the first region to move in a direction of the second region.

17. The particles actuating device as claimed in claim 16, wherein the multi-region device comprises a layer having a surface with hydrophilic regions defining the first and second regions, and a hydrophobic region defining the valve region.

* * * * *